United States Patent
Neuberth et al.

(10) Patent No.: US 8,639,425 B2
(45) Date of Patent: Jan. 28, 2014

(54) AUTOMATED SYNCHRONIZATION

(75) Inventors: Ulrich Neuberth, Oetigheim (DE); Frank Bast, Buehlertal (DE); Bjoern Stehle, Buehlertal (DE)

(73) Assignee: Schaeffler Technologies AG & Co. KG (DE)

( * ) Notice: Subject to any disclaimer, the term of this patent is extended or adjusted under 35 U.S.C. 154(b) by 0 days.

(21) Appl. No.: 13/294,784

(22) Filed: Nov. 11, 2011

(65) Prior Publication Data
US 2012/0065848 A1    Mar. 15, 2012

Related U.S. Application Data

(63) Continuation of application No. PCT/DE2010/000475, filed on Apr. 26, 2010.

(30) Foreign Application Priority Data

May 14, 2009    (DE) .................. 10 2009 021 343

(51) Int. Cl.
*F16H 61/04*    (2006.01)
*F16H 61/08*    (2006.01)

(52) U.S. Cl.
CPC ............ *F16H 61/0403* (2013.01); *F16H 61/08* (2013.01); *F16H 2306/48* (2013.01)
USPC ............................................. 701/58; 701/66

(58) Field of Classification Search
USPC ............................................................ 701/51
See application file for complete search history.

(56) References Cited

U.S. PATENT DOCUMENTS

| | | | | |
|---|---|---|---|---|
| 4,856,361 A | * | 8/1989 | Shinmoto | 74/339 |
| 4,940,122 A | * | 7/1990 | Fujieda | 192/3.31 |
| 6,346,063 B1 | * | 2/2002 | Kondo et al. | 477/143 |
| 6,390,949 B1 | * | 5/2002 | Kondo et al. | 477/143 |
| 6,935,204 B2 | * | 8/2005 | Walker et al. | 74/335 |
| 2001/0032523 A1 | | 10/2001 | Hillenbrand et al. | |
| 2005/0092115 A1 | * | 5/2005 | Walker et al. | 74/335 |

FOREIGN PATENT DOCUMENTS

| | | | |
|---|---|---|---|
| DE | 102005054623 | 6/2006 | |
| DE | 102005037695 | * 2/2007 | |
| EP | 1983226 | 10/2008 | |
| EP | 1983226 A1 | * 10/2008 | F16H 61/04 |
| WO | 03081091 | 10/2003 | |

* cited by examiner

*Primary Examiner* — Shelley Chen
(74) *Attorney, Agent, or Firm* — Simpson & Simpson, PLLC

(57) ABSTRACT

A method for making the synchronization process in automatic transmissions more robust and shortening the same, while at the same time taking the noise comfort into consideration.

12 Claims, 1 Drawing Sheet

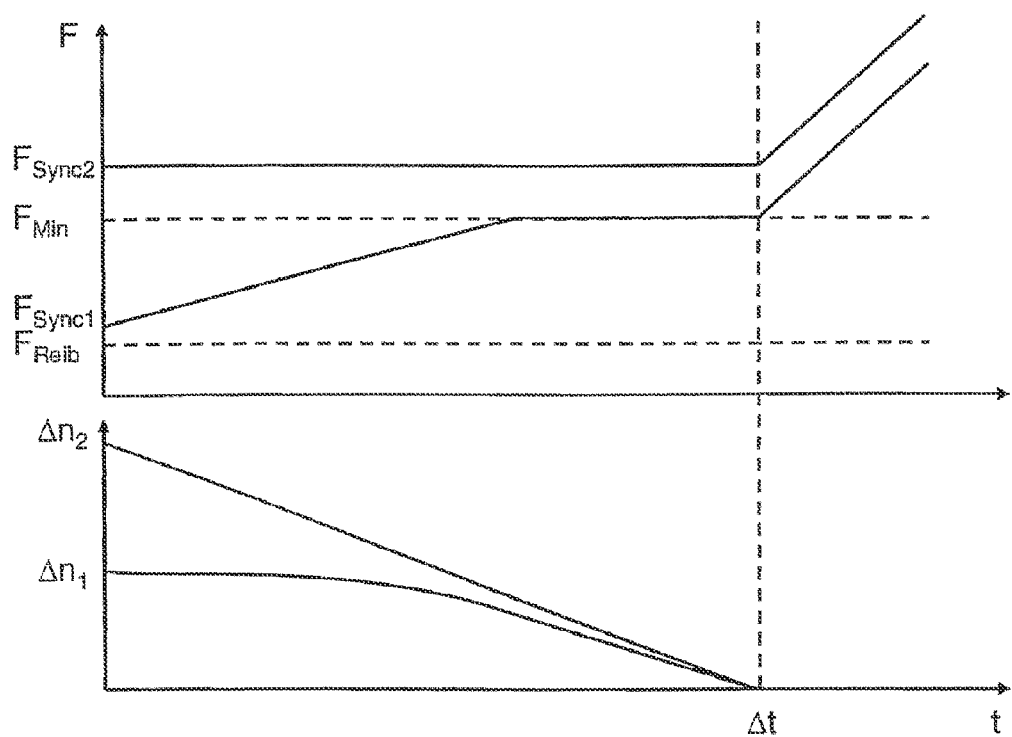

AUTOMATED SYNCHRONIZATION

CROSS-REFERENCE TO RELATED APPLICATIONS

This application is filed under 35 U.S.C. §120 and §365(c) as a continuation of International Patent Application No. PCT/DE2010/000475 filed Apr. 26, 2010, which application claims priority from German Patent Application No. DE 10 2009 021 343.0 filed May 14, 2009, which applications are incorporated herein by reference in their entireties.

FIELD OF THE INVENTION

The present invention relates generally to a method of controlling a synchronizing device during a shifting operation in an auto shift gearbox in a motor vehicle.

BACKGROUND OF THE INVENTION

Automated transmission systems such as auto shift gearboxes (ASG) and parallel shift gearboxes (PSG) that comprise a single or multiple shaft transmission are known in the field of motor vehicle technology. To change the transmission ratio, i.e., to shift gears in such a transmission, an idler gear of the current gear speed, i.e., the actual gear, is separated from the transmission input shaft and an idler gear of the desired gear, i.e., the target gear, is connected to the transmission input shaft in a form-fitting manner. However, due to the transmission ratio difference, there is a rotational speed difference between the transmission input shaft of the idler gear and the idler gear to be shifted to; a fact which precludes a form-fitting connection without gear noises such as creaking. For reasons of comfort, synchronization devices such as locking synchronizations are used to synchronize the rotational speed difference between the idler gear and the idler gear shaft.

The operation of the synchronization device may, for instance, be subdivided into five phases of the synchronization process.

In a first phase, an approximate synchronization is achieved wherein a movement of a switching sleeve that is connected to the idler shaft so as to be fixed against rotation but displaceable in the axial direction presses a synchro ring against the friction cone of an idler gear clutch body via thrust pieces. Due to the existing rotational speed difference between the clutch body and the switching sleeve the synchro ring is screwed into the stop.

In the second phase, the actual synchronization takes place. In the process, the switching spline of the switching sleeve is pressed against the roof chamfers of the synchro ring via its roof chamfers at a synchronization force. In this manner the resultant moment of friction accelerates or decelerates the idler gear. As long as there is a rotational speed difference, the moment of friction will always be greater than the moment of spline so that the synchronization device locks.

In a third phase, the synchro ring is rotated backwards to unlock the synchronization device.

In a fourth phase, the clutch body is rotated and thus causes the idler gear to rotate in a way to allow the switching sleeve to mesh.

Finally, in a fifth phase a form-fitting connection between the splines is created by completely meshing the switching spline with the clutch body.

In order to achieve optimum synchronization, a particularly soft initial approximate synchronization at a limited synchronizing force and at a suitable speed is required to avoid too sharp an increase of the moment of friction and to prevent the synchro ring from hitting hard against the stop. Otherwise, especially at low rotational speed differences, the synchronization may result in switching noises that may influence the power take-off.

In addition, the synchronizing force needs to be chosen to be sufficiently high to ensure suitably short synchronization periods depending on the rotational speed difference to be synchronized. Especially in auto shift gearboxes, a prolonged synchronization period has a negative effect on the switching convenience because of the extended interruption of the tractive force. Moreover, an increased energy input may damage the synchronization device.

Moreover, a sufficiently high synchronizing force is necessary to ensure a quick locking and meshing process. If this process takes too long, a new rotational speed difference may occur and may again cause meshing noise.

In order to meet these requirements in auto gearbox systems, the individual phases of the synchronizing process, in particular the locking and unlocking of the synchronizing device, need to be clearly distinguished. In general, due to the costs involved, gearbox systems operated by electric motors have dispensed with sensors to determine the initial gear speed and the shift finger force. Thus it is impossible to determine by sensors either the beginning of the synchronization, i.e., the locking, or the end of the synchronization, i.e., the unlocking, based on the input gear speed in correlation with the target input gear speed in the gear to be shifted to resulting from the vehicle speed and the total gear ratio or based on the switching force progression.

Thus it has become known in the field of vehicle technology to determine these phases based on the change of the condition of movement of the gearshift actuation in the shifting direction. For this purpose, the shifting sleeve is moved towards synchronization at a predetermined speed as a function of the target synchronizing force and a limited approximate synchronization force. A functional correlation can be given under the condition that the kinetic energy stored in the movement in the actuator by the inert mass relating to the shift finger is completely transmitted as potential energy to the stiffnesses reduced to the shift finger with the spring rate. If the shifting sleeve is retarded by a certain amount, a locking can be detected and the synchronizing force can be applied statically. In an analogous manner, the unlocking can be detected by an acceleration of the shifting sleeve by a certain amount.

The published German Patent Application No 10 2005 054 623 A1 discloses a synchronizing process at a constant synchronizing force that is selected as a function of the gas pedal, gear and rotational speed difference at the beginning of the shifting process. In situations of low loads, this synchronizing force is selected to be very small to keep the noise created at starting the synchronization unit at a comfortable level. At higher loads, the synchronizing force is selected to prevent the synchronizing process in the current situation from appearing as an uncomfortable jolt and at the same time to keep the synchronizing period as short as possible.

The start up of the synchronization unit occurs in a speed-controlled way at a shifting actuator speed that is selected to cause the applied constant synchronizing force to occur upon impacting on the synchronization unit. While the rotational speeds are synchronized, the shifting actuator is operated in a power-controlled way via the current. The resultant synchronizing force, however, is reduced by the friction of the system. Thus the actual synchronizing force may be very low, causing the synchronizing period to be very long.

If the synchronizing force is too high, undesirable noise at the beginning of the synchronizing process is the result. If the synchronizing force is too small, the synchronizing process takes a very long time.

To make sure that synchronizing takes place at all, an expected synchronization duration is calculated from the nominal synchronizing force, the rotational speed difference to be synchronized, and from gear-dependent parameters. Once this time has elapsed, the synchronizing force is increased. However, this is an emergency strategy which causes the synchronizing force to increase relatively late and potentially too much.

BRIEF SUMMARY OF THE INVENTION

An object of the invention is to find a way of modifying the synchronizing force process in way to ensure that very low synchronizing forces are possible at the beginning of the synchronizing process, the synchronizing process is completed in a reliable way and within an acceptable period of time, and the synchronizing force does not reach uncomfortably high levels.

At the same time, the emergency strategy including a prognosis of the synchronization duration and an increase of the synchronizing force if this period is exceeded is to be maintained.

The method of the invention is a way to make the synchronizing process in auto shift gearboxes more robust and to shorten it while at the same time taking a comfortable noise level into consideration.

In accordance with the invention, the method provides controlling a synchronizing device in a shifting process in auto shift gearboxes in a motor vehicle. A synchronization duration is determined and, if the target synchronizing force at the moment of impact on the synchronization unit is lower than a predetermined threshold $F_{Min}$, the target synchronizing force is increased from the moment of impact on the synchronization unit on at a defined gradient g until the predetermined threshold $F_{Min}$ is reached.

In the context, the target synchronizing force at the moment of impact on the synchronization unit equals an applied synchronizing force.

The predetermined threshold is provided to be above the maximum expected friction but below a level that would lead to losses of comfort due to the synchronizing jolt.

The target synchronizing force is kept constant if, at the moment of impact on the synchronization unit, the target synchronizing force is higher than a predetermined threshold.

In this context, the moment of impact on the synchronization unit is the moment of impact against each other of two friction surfaces to be synchronized.

In accordance with a preferred embodiment, the moment of impact on the synchronization unit is the moment of impact of the friction surface of the synchro ring onto the friction surface of the shift gear.

A provision is made to initiate emergency measures if the synchronization is not completed after the synchronization duration, beginning at the moment of impact on the synchronization unit, has elapsed.

The emergency measures include a further increase of the target synchronizing force.

The synchronizing time is calculated as $$\Delta t = c_{Gang} \cdot \frac{\Delta n}{(F_{Min} - F_{Reib})} + \frac{(F_{Min} - F_{Sync})^2}{2 \cdot g \cdot (F_{Min} - F_{Reib})}$$

if the applied synchronizing force $F_{Sync}$ is smaller than the defined threshold $F_{Min}$, with $\Delta n$ the rotational speed difference to be synchronized, $F_{Sync}$ the applied synchronizing force, $F_{Reib}$ the friction force, $c_{Gang}$ a gear-dependent coefficient and g a time gradient.

The synchronizing time is calculated as $$\Delta t = c_{Gang} \cdot \frac{\Delta n}{(F_{Sync} - F_{Reib})}$$

if the applied synchronizing force $F_{Sync}$ is higher than the predetermined threshold $F_{Min}$, with $\Delta n$ the rotational speed difference to be synchronized, $F_{Sync}$ the applied synchronizing force, and $c_{Gang}$ a gear-dependent coefficient.

The invention also refers to a computer program product with a computer program including software means for implementing the method indicated above when the computer program is executed on a computer. Such a computer may be part of the control device.

The invention also proposes a device with a control apparatus for controlling a synchronizing device in a shifting process in an auto shift gearbox in a motor vehicle. The control apparatus is provided to determine a synchronizing time, and if the target synchronizing force at the moment of impact on the synchronization unit is lower than a predetermined threshold $F_{Min}$, starting at the moment of impact on the synchronization unit, the target synchronizing force is increased in accordance with a predetermined gradient g until the predetermined threshold $F_{Min}$ is attained.

In accordance with the methods described above, very low initial synchronizing forces are possible for the synchronizing process to advantageously minimize noise during the start-up of the synchronization.

A dynamic linear increase of the synchronizing force advantageously results in a reliable synchronizing process of acceptably short duration.

The dynamic increase is limited to a value that does not cause a loss of comfort such as a jolt even in case of low-load shifts.

Since friction is taken into consideration and due to the linear increase, a more precise prognosis of the synchronization duration is possible, thus ensuring that the emergency strategy works reliably.

BRIEF DESCRIPTION OF THE DRAWINGS

Further advantages and advantageous embodiments of the invention will become apparent from the FIGURE listed below and its description.

FIG. 1 illustrates the synchronization process.

DETAILED DESCRIPTION OF THE INVENTION

FIG. 1 illustrates the progression of the synchronizing force F for two initial synchronizing forces $F_{Sync1}$ and $F_{Sync2}$ of different height and an expected progression of the rotational speed difference $\Delta_{n1}$ and $\Delta_{n2}$ for the two cases.

The synchronizing process is started at a speed that corresponds to the applied synchronizing force. The synchronizing force is defined at the drive tuning stage and is thus a predetermined value. Starting from the moment when the impact on the synchronization unit is detected and force-controlled synchronization takes place, the target synchronizing force—beginning at the applied synchronizing force—is increased in accordance with a predetermined gradient until it reaches a value that is clearly above the maximum expected friction force but is not expected to incur any loss of comfort due to a synchronizing jolt. This value is likewise determined at the drive tuning stage or may be known in advance.

Signals of the electric motor that drives the shift finger are available to the method. These signals include voltage signals and relative position signals. Upon impact on the synchronization unit, i.e., when two friction surfaces intended for synchronization, for example the friction surface of the synchro ring and the friction surface of the shift gear, get into contact, the result is a considerable resistance increase. The start of the synchronization is the phase in which the shift actuator is moved in a speed-controlled way to generate a predetermined applied force when the friction surfaces meet and the resistance occurs. This phase starts when the actuator is in a position in which this resistance is not yet expected.

As this method does no longer involve a constant synchronizing force, the prognosis model for the synchronization duration needs to be broadened to suitably encompass this fact to ensure that the emergency strategy works expediently. In addition, it is useful to take the typical friction into consideration, which has not been included in the model so far.

The conventional model for prognosticating the synchronization duration assumes that the synchronization duration $\Delta t[s]$ is proportional to the rotational speed difference $\Delta n[rpm]$ to be synchronized and the inverse of the applied synchronizing force $F_{Sync}[n]$, with a gear-dependent coefficient $$c_{Gang}\left[\frac{ms \cdot N}{rpm}\right]:$$

$$\Delta t = c_{Gang} \cdot \frac{\Delta n}{F_{Sync}}$$

If one considers the friction force $F_{Reib}[N]$ and a linear increase of the synchronizing force up to the value $F_{Min}[N]$ with the time gradient $$g\left[\frac{N}{s}\right],$$

a complete analytical solution is possible. However, such a solution includes a root function, which has relatively high computing requirements in a control apparatus. If one assumes that the linear increase of the synchronizing force during the synchronizing process has reached the value $F_{Min}$, and the synchronizing force $F_{Sync}$ exceeds the friction force $F_{Reib}$, the calculation becomes much simpler. If the applied synchronizing force $F_{Sync}$ is already higher than $F_{Min}$ and one considers the friction force $F_{Reib}$, the equation, in a manner analogous to the equation above, is $$\Delta t = c_{Gang} \cdot \frac{\Delta n}{(F_{Sync} - F_{Reib})}$$

If the applied synchronizing force $F_{Sync}$ is less than $F_{Min}$, the result is $$\Delta t = c_{Gang} \cdot \frac{\Delta n}{(F_{Min} - F_{Reib})} + \frac{(F_{Min} - F_{Sync})^2}{2 \cdot g \cdot (F_{Min} - F_{Reib})}$$

In the case of very small rotational speed differences and very small synchronizing forces, the assumption that the synchronizing force will have reached the force $F_{Min}$ at the end of the synchronization is not true. In this case, the synchronization duration calculated according to the equation given above will be slightly too long. However, this deviation is not critical for the purpose of the emergency strategy.

The disclosed method combines the opposing requirements of using low synchronizing forces at the start of the synchronization and high synchronizing forces to ensure reliable synchronization. At the same time, there is no loss of predictability compared to conventional methods of the prior art using constant synchronizing forces. In addition, a prognosis of the synchronization duration was improved, in particular for low synchronizing forces, because friction is factored in and the synchronizing force increases dynamically.

What is claimed is:

1. A method of controlling a synchronizing device during a shifting operation in an auto shift gearbox in a motor vehicle, wherein:
    a synchronization duration is determined using a formula including a friction force and, if the target synchronizing force is below a predetermined threshold ($F_{Min}$) at the moment of impact on the synchronization unit, the target synchronizing force is increased from the moment of impact on the synchronization unit in accordance with a predetermined gradient (g) until the predetermined threshold ($F_{Min}$) is reached;
    at the moment of impact on the synchronization unit, the target synchronizing force equals an applied synchronizing force ($F_{synch1}$); and,
    at the moment of impact, the applied synchronizing force ($F_{synch1}$) is greater than zero.

2. The method as set forth in claim 1, wherein the predetermined threshold exceeds the maximum expected friction force but is below a value for which losses of comfort due to a synchronizing jolt are expected.

3. The method as set forth in claim 1, wherein the target synchronizing force is kept constant if at the moment of impact on the synchronization unit the target synchronizing force is higher than a predetermined threshold.

4. The method as set forth in claim 1, wherein the moment of impact on the synchronization unit is the moment of impact of two friction surfaces to be synchronized upon each other.

5. The method as set forth in claim 1, wherein the moment of impact on the synchronization unit is the moment of impact of the friction surface of the synchro ring on the friction surface of the shift gear.

6. The method as set forth in claim 1, wherein emergency measures are initiated when the synchronization is not completed after the synchronization duration starting at the moment of impact on the synchronization unit has elapsed.

7. The method as set forth in claim 6, wherein the emergency measures include a further increase of the target synchronization force.

8. The method as set forth in claim 1, wherein the synchronization duration is calculated in accordance with the equation $$\Delta t = c_{Gang} \cdot \frac{\Delta n}{(F_{Min} - F_{Reib})} + \frac{(F_{Min} - F_{Sync})^2}{2 \cdot g \cdot (F_{Min} - F_{Reib})}$$

if the applied synchronizing force ($F_{Sync}$) is below the predetermined threshold ($F_{Min}$), with $\Delta n$ the rotational speed difference to be synchronized, $F_{Sync}$ the applied synchronizing force, $C_{Gang}$ a gear-dependent coefficient, and g a time gradient.

9. The method as set forth in claim 1, wherein the synchronization duration is calculated in accordance with the equation $$\Delta t = c_{Gang} \cdot \frac{\Delta n}{(F_{Sync} - F_{Reib})}$$

if the applied synchronizing force is higher than the predetermined threshold ($F_{Min}$), with $\Delta n$ the rotational speed difference to be synchronized, $F_{Sync}$ the applied synchronizing force, and $C_{Gang}$ a gear-dependent coefficient.

10. The method as set forth in claim 3, wherein the synchronization duration is calculated in accordance with the equation $$\Delta t = c_{Gang} \cdot \frac{\Delta n}{(F_{Sync} - F_{Reib})}$$

if the applied synchronizing force is higher than the predetermined threshold ($F_{Min}$), with $\Delta n$ the rotational speed difference to be synchronized, $F_{sync}$ the applied synchronizing force, and $C_{Gang}$ a gear-dependent coefficient.

11. The method as set forth in claim 4, wherein the moment of impact on the synchronization unit is the moment of impact of the friction surface of the synchro ring on the friction surface of the shift gear.

12. A device including a control apparatus for controlling a synchronizing device during a shifting operation in an auto shift gearbox in a motor vehicle, wherein:
   the control apparatus is provided to determine a synchronization duration using a formula including a friction force and to ensure that, if at the moment of impact on the synchronization unit, the target synchronizing force is below a predetermined threshold ($F_{Min}$), beginning at the moment of impact on the synchronization unit, the target synchronizing force is increased in accordance with a predetermined gradient (g) until the predetermined threshold ($F_{Min}$) is reached;
   at the moment of impact on the synchronization unit, the target synchronizing force equals an applied synchronizing force ($F_{synch1}$); and,
   at the moment of impact, the applied synchronizing force ($F_{synch1}$) is greater than zero.

* * * * *